March 28, 1939.  A. J. HARTLEY  2,152,310
CLUTCH MECHANISM
Filed Oct. 9, 1935  3 Sheets-Sheet 1
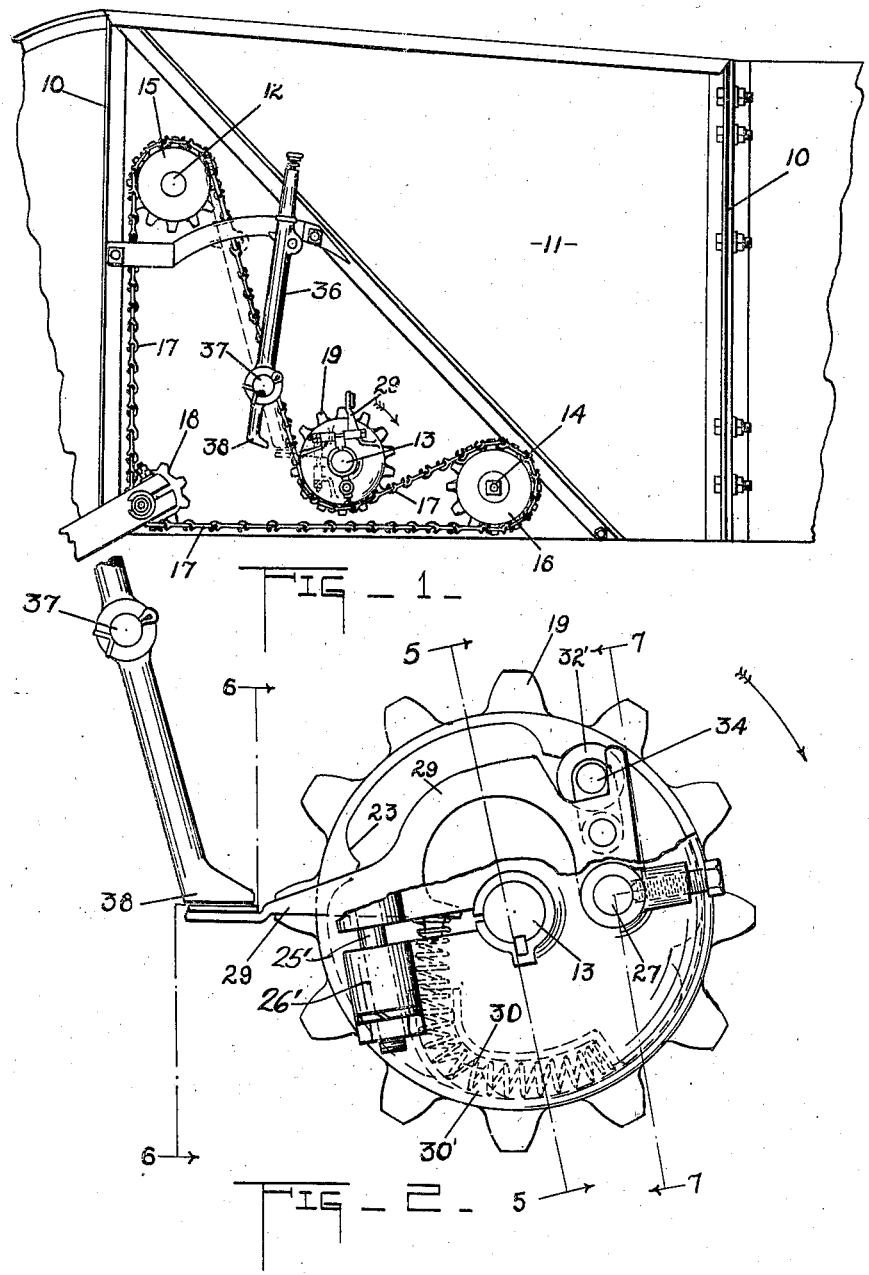
INVENTOR
Arthur J Hartley
BY
Jefft v Jefft
ATTORNEYS March 28, 1939.　　A. J. HARTLEY　　2,152,310
CLUTCH MECHANISM
Filed Oct. 9, 1935　　3 Sheets-Sheet 2

INVENTOR
Arthur J. Hartley
BY
Zeff & Zeff
ATTORNEYS

March 28, 1939.  A. J. HARTLEY  2,152,310
CLUTCH MECHANISM
Filed Oct. 9, 1935   3 Sheets-Sheet 3

INVENTOR
Arthur J Hartley
BY
Jefft v Jefft
ATTORNEYS

Patented Mar. 28, 1939

2,152,310

UNITED STATES PATENT OFFICE 2,152,310

CLUTCH MECHANISM

Arthur J. Hartley, Peoria, Ill.; The Central National Bank and Trust Company of Peoria and Neta S. Hartley, executors of said Arthur J. Hartley, deceased, assignors to Hart-Carter Company, Peoria, Ill., a corporation of Delaware Application October 9, 1935, Serial No. 44,145

3 Claims. (Cl. 192—28)

This invention relates to clutch mechanism and has for its principal object to provide a clutch of sturdy design embodying a new principle in operation.

Another object is to provide a clutch mechanism suitable for use in connection with heavy machinery and capable of being operated to control heavy driving loads with ease and despatch.

Other objects will appear in the following description and accompanying drawings in which;

Fig. 1 is an elevational view showing my clutch mechanism incorporated in a driving mechanism as will be explained;

Fig. 2 is an enlarged elevational view showing details of the clutch mechanism with certain parts broken away to permit clearer view of underlying parts;

Figure 3:
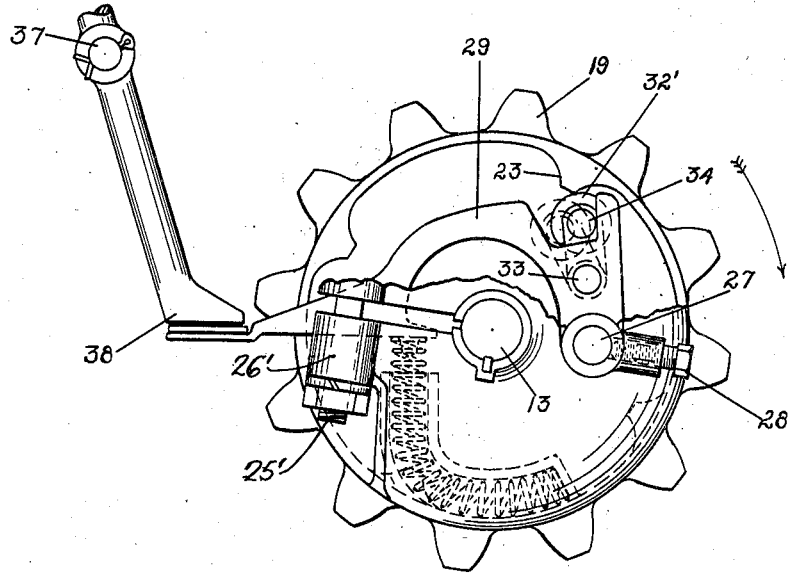
Figs. 3 and 4 are views similar to Fig. 2, showing parts in several operated positions as will be described.

For illustration I show my clutch mechanism attached in driving relationship with a portion of the driving mechanism of a thrasher feeder device. The latter device is not a part of the invention and is therefore not shown or described in detail. It may be assumed to be disposed behind a supporting structure which includes a frame structure 10 and a plate cover member 11.

Three of the shafts of the device, 12, 13 and 14 extend outside the plate 11 as shown. Shafts 12 and 14 carry sprockets 15 and 16, which are driven in unison by means of a chain 17 which passes over an idler 18 and engages a sprocket portion 19 of my clutch mechanism.

It is assumed that shaft 12 is constantly rotated, by a power source not shown, to drive the shaft 14 while at the same time the shaft 13 is intermittently rotated as desired by means of my clutch mechanism, the sprocket portion of which is constantly rotated by chain 17. Through the clutch, driving connection may be established between chain 17 and shaft 13 as will be explained.

Figure 5:
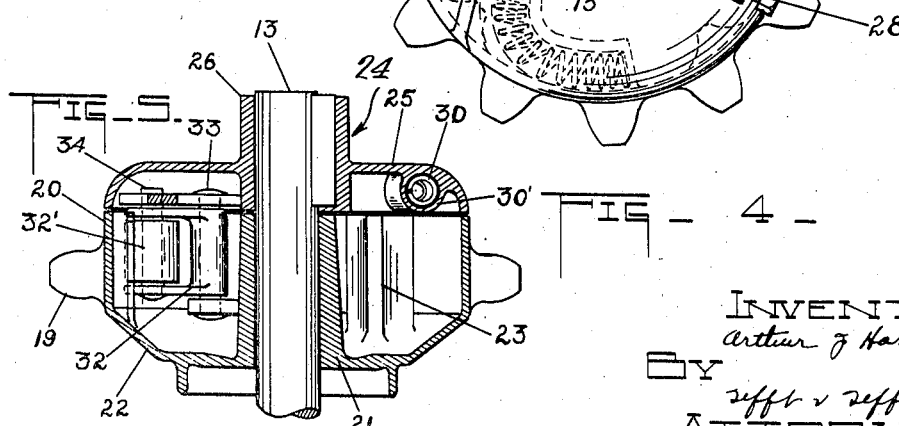
Fig. 5 is a sectional view taken on line 5—5 in Fig. 2.
Figure 6:
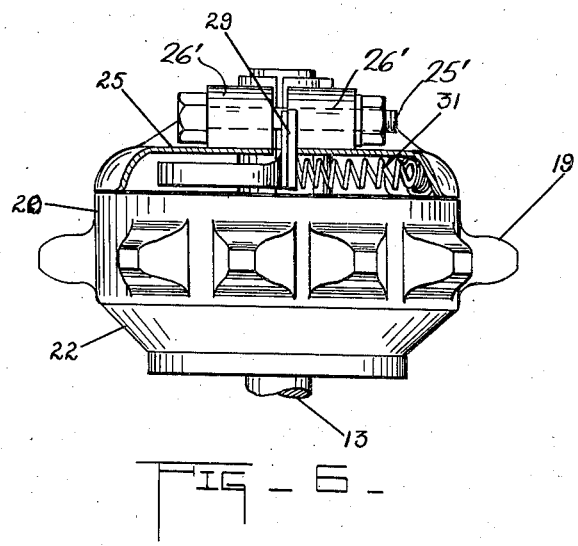
Fig. 6 is an elevational view with a portion cut away and showing details of mechanism.

The mechanism of my clutch consists of a member 20, Fig. 5, which is, in fact a sprocket wheel having a broadened rim portion carrying teeth, which rim portion is connected with a hub portion 21 by an offset wall portion 22, the fashioning of the part being such as to provide a hollow area between the hub and rim with one side open.

Interior of the rim portion is a series of lugs 23 which have arcuate sides as shown.

The hub 21 is rotatably mounted on shaft 13. Opposite the open side of the sprocket wheel and keyed to shaft 13 is a member 24 comprising a frame or housing portion 25 and a hub 26. Rigid fastening of the member 24 is provided by the clamp bolt 25' through bosses 26'.

A stud 27 is affixed in the wall of housing 25 by means of a screw 28.

Stud 27 is disposed off center of the housing and carries an arm 29 which is so fashioned as to pass around shaft 13 and extend beyond the housing wall, there being an opening in the wall of sufficient size to permit movement of the arm with respect to the housing.

Arm 29 terminates at a point offset from the device as shown in Fig. 2, the outer end being approximately opposite the stud 27.

Within the housing there is an elongated arcuately formed aperture 30', the open end of which lies opposite arm 29 with its center line at this point lying at approximately right angles to the arm as shown in the several views.

Within the aperture is a spring 30 which is loosely fitted and is flexed to follow the line of the aperture and is arranged to press against arm 29 to urge the latter toward a predetermined position as will be explained. The object of the described spring arrangement is to provide a long spring capable of considerable longitudinal flexing while at the same time being confined within the relatively small area of the housing.

Figure 7:
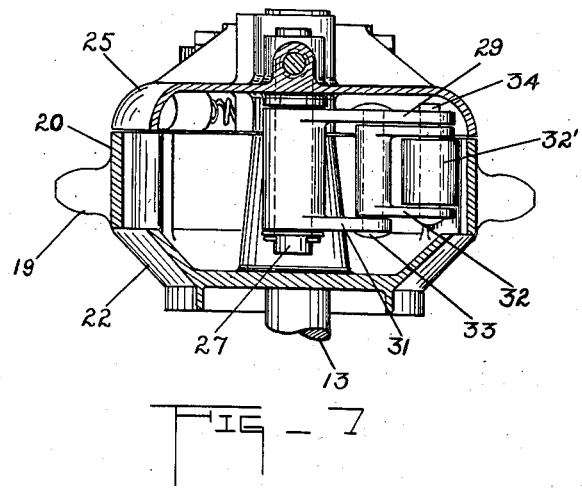
Fig. 7 is a sectional view taken on line 7—7 in Fig. 2.

Near stud 27, the hub portion of arm 29 carries a second short arm 31, see Fig. 7.

Between arms 29 and 31 there is disposed a double armed member 32 mounted for loose pivotal movement by means of a pin 33.

Between the arms of member 32 is a roller 32' mounted by means of a pin 34, one end of which extends beyond the arm of member 32. The extending end of the pin is engaged by the walls 35 of an opening in arm 29. The opening is so dimensioned as to permit limited pivotal movement of member 32 for a purpose to be explained.

Mounted adjacent the clutch mechanism is a lever 36 supported for pivotal movement on the frame structure 10—11 by means of a stud 37. The lever has an upper manually accessible arm and a lower arm terminating in a foot portion 38 which may be moved into or out of engagement with arm 29 as indicated in Figs. 1 and 4.

Figure 4:
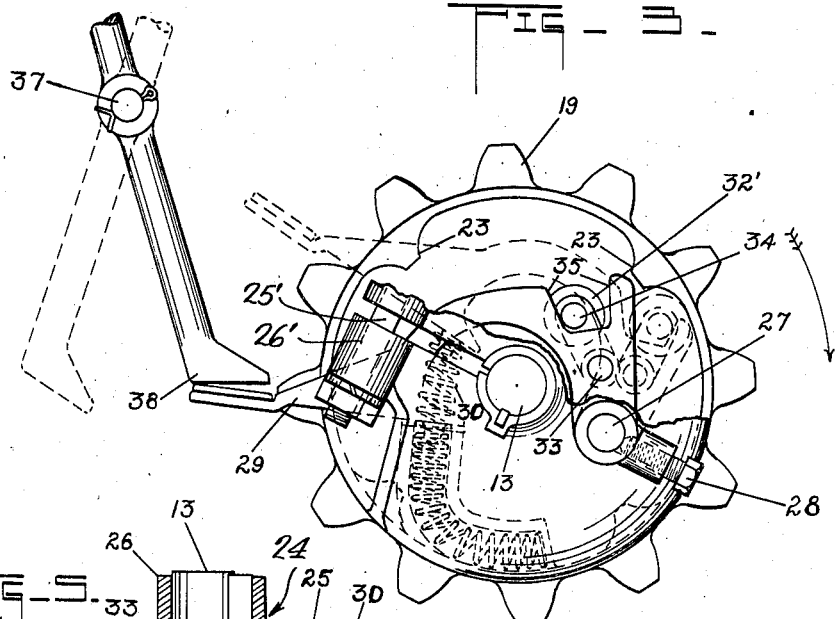

Operation of the mechanism is as follows:

With sprocket 19 rotating and parts in position shown in solid lines in Fig. 4, pin 34 with roller 32' is held inward toward shaft 13, by gravity away from the path of lugs 23. When foot 38 is moved to the dotted line position, arm 29 is released and is induced by spring 30 to rotate upon stud 27 to the dotted line position, whereby roller 32' is moved to engage one of lugs 23 as shown. By this means a driving connection is established between the rotating sprocket, housing 25 and shaft 13. With parts in this position, arm 29 will continuously revolve with shaft 13 so long as foot 38 remains in offset position.

When it is desired to break the driving connection, the foot 38 is moved into the solid line position whereupon arm 29 eventually engages with it. Rotative movement of arm 29 is thus arrested while stud 27 continues to revolve with housing 25, which brings about rotation of arm 29 upon stud 27 and this causes the outer wall 35 to engage the pin 34 to force roller 32' out of engagement with lug 23 as indicated in Fig. 3.

Fig. 3 shows roller 32' in position where it is about to escape from lug 23, and when final escapement takes place, member 32, being loosely mounted, will fall backwardly into the position shown in Fig. 4 in which position it will remain until the foot 38 is again withdrawn as above described.

It is to be noted that roller 32', once it escapes from lug 23, thereafter remains in a position a considerable distance from the moving lugs so that there is no possibility of accidental re-engagement of the clutch and no possibility of partial engagement to cause "chattering" which is a common fault of most clutches of the escapement type.

It is further to be noted that any desired means other than manual may be utilized to operate the member 38. The manual means is herein shown for the purpose of illustration only.

Modifications of structure of my clutch mechanism are obviously possible without alteration of the principle disclosed. I do not wish to be limited in structure or function except within the scope of the appended claims.

What I claim is:

1. In a clutch mechanism of the class described, the combination of a driving member revolving on a shaft, consisting of a bell shaped housing enclosing a central bearing boss and arcuate faced driving lugs on its inner periphery, a driven member fixed to said shaft and substantially closing the open end of the driving member, an arm within this enclosure and extending outwardly therefrom rockably mounted on a pivot relatively fixed eccentric to said shaft, a second arm pivotally mounted at one of its ends on the first said arm, a pawl element rotatably carried by the other end of said second arm whereby it engages a driving lug when the first said arm is in clutch engaging position and clears said driving lugs when the first said arm is out of clutch engaging position, means engageable with the first said arm for swinging the same about its pivot to cause said pawl to engage with and to disengage from said driving lugs, and a projection on the arm extending outward from the enclosing members to engage the means to cause the swinging movement of said arm.

2. In a power clutch mechanism, a shaft, a driving member freely rotatable upon said shaft, a driven member secured to said shaft for rotation therewith, and means for clutching and de-clutching said driving and driven members comprising, an operating lever arm pivotally mounted on the driven member, a second arm pivotally mounted on said lever arm for swinging movements with respect thereto under the influence of gravity in one direction, spaced abutment means carried by said lever arm for swinging said second arm between limits relative to the lever arm, said spaced abutments providing a lost motion connection between said lever and second arms whereby gravity may affect said second arm, a clutch pawl carried by said second arm, and means secured to the driving member and engageable with said pawl when said lever arm is moved to one position.

3. In a power clutch mechanism, a shaft, a driving member freely rotatable upon said shaft, a driven member secured to said shaft for rotating the same, arcuate faced driving lugs carried internally of said driving member, and means for clutching and de-clutching said driving and driven members comprising, an operating lever arm pivotally associated with the driven member, a second arm pivotally secured to said lever arm for swinging movements with and with respect thereto, means carried by said lever arm for swinging said second arm between limits relative to the lever arm, said last mentioned means including abutments spaced apart sufficiently to permit swinging movements of the said second arm with respect to the lever arm, a clutch pawl carried by said second arm and engageable with one of said arcuate faced driving lugs when said second arm is swung about its pivot in one direction, means normally operative to move said lever arm to cause one of said abutments to swing said second arm into a position to engage said pawl and one of said arcuate lugs, and means for operating said lever arm to disengage said pawl from the arcuate lug with which it is engaged.

ARTHUR J. HARTLEY.